2,985,422

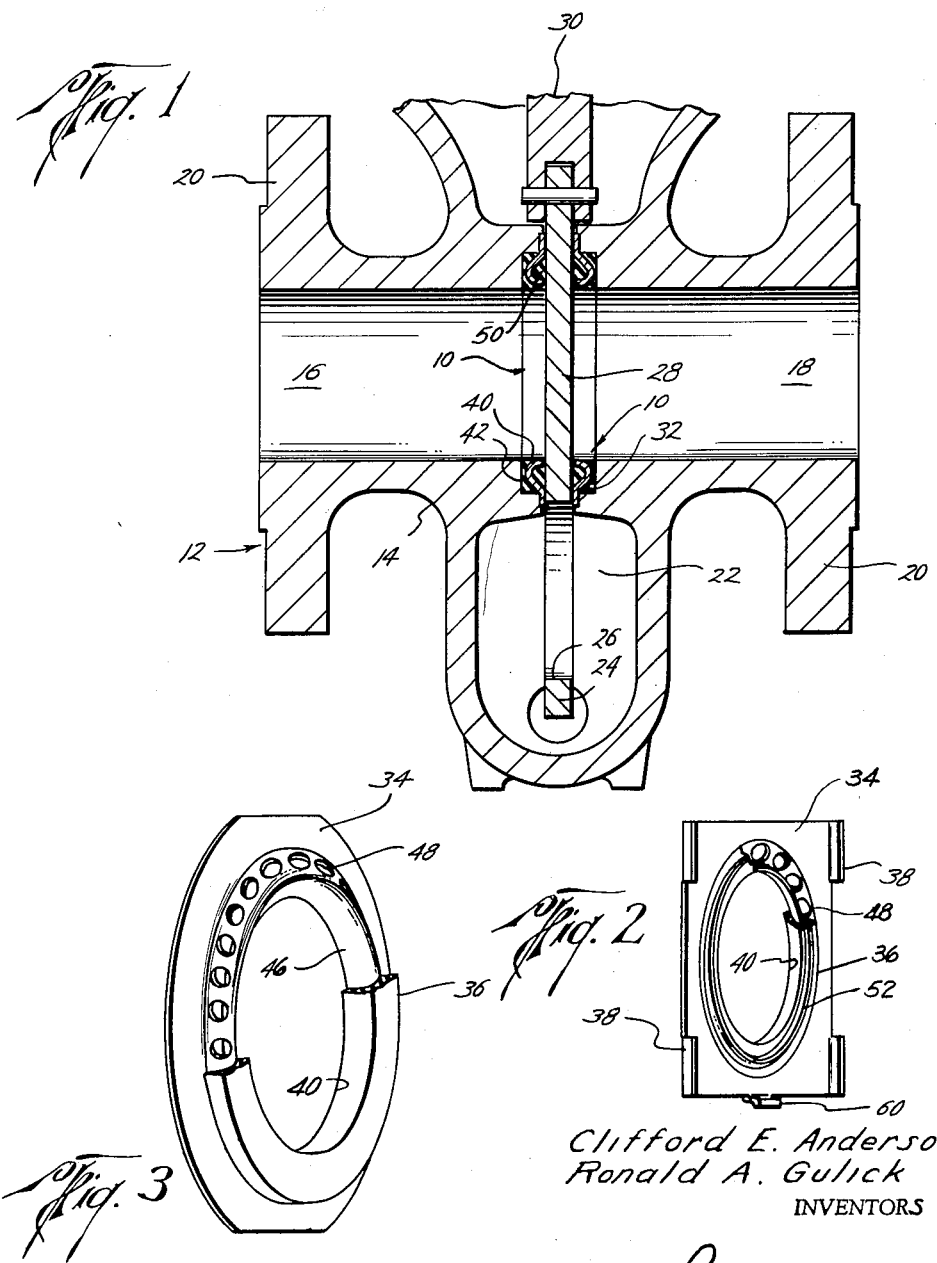

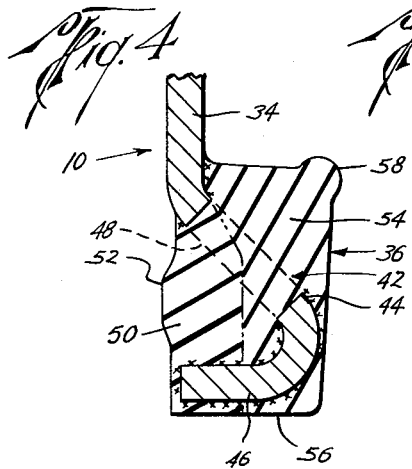
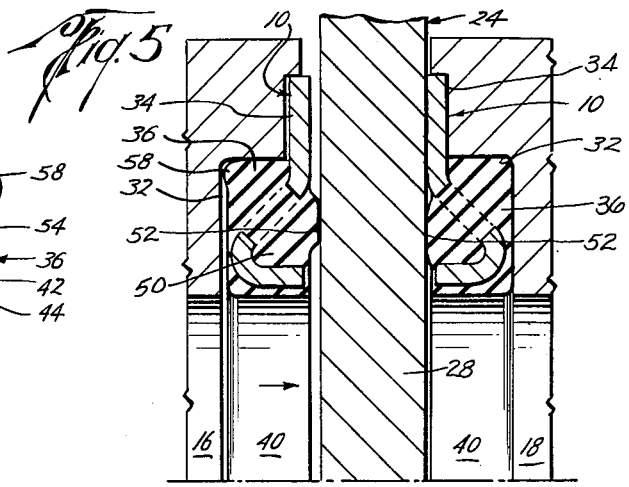
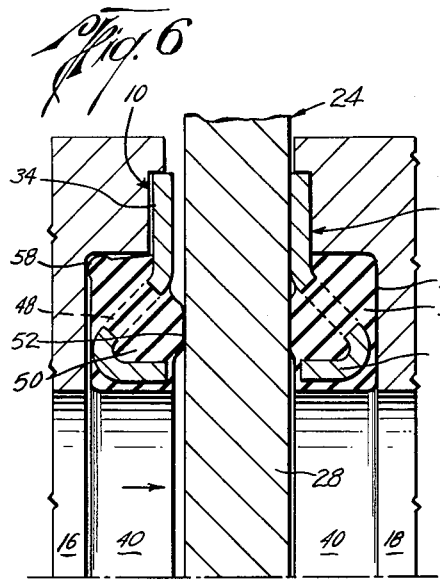
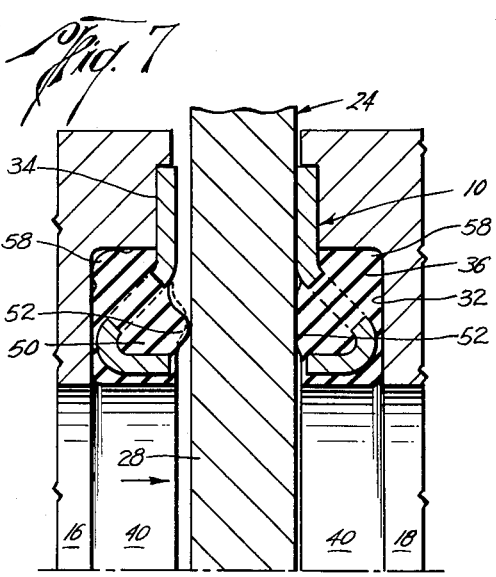
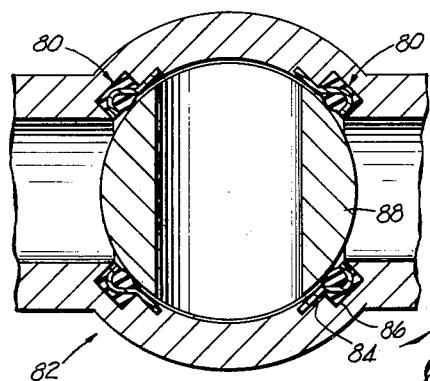
Clifford E. Anderson
Ronald A. Gulick
INVENTORS

United States Patent Office 2,985,422
Patented May 23, 1961

PRESSURE SEALING VALVE

Clifford E. Anderson and Ronald A. Gulick, Houston, Tex., assignors to ACF Industries, Incorporated, New York, N.Y., a corporation of New Jersey Filed Oct. 30, 1957, Ser. No. 693,399

13 Claims. (Cl. 251—172)

This invention relates generally to valves and more particularly to a valve having an improved pressure sealing member.

In valves incorporating the improved pressure sealing member, the sealing member, which is comprised of a structural member having resilient material bonded thereto, is positioned in a seat pocket formed coaxially with the flow passage through the valve. A valve member is interposed between two seal members. The seal member is so constructed that the valve will seal upstream and downstream. Also, the valve will simultaneously seal on both sides with the body bled for use in block and bleed service. The seal member is so constructed that excessive body pressure will be automatically relieved. Moreover, the seal member even though having a resilient face can be easily assembled and will not be blown out on opening of the valve or pinched off on closing. Also, upon any wearing of the face of the seal, additional resilient material will automatically replace it.

It is a primary object of the present invention to provide an improved pressure sealing valve incorporating resilient sealing members which will seal both upstream and downstream.

It is a general object to provide improved resilient seal members for a valve which will be self compensating for wear.

It is another object to provide improved resilient seal members for a valve which are so constructed that excessive body pressure will be relieved.

It is another object to provide an improved pressure sealing valve which will simultaneously seal both upstream and downstream with the body bled.

It is a further object to provide an improved resilient seal member for a valve which will have excellent sealing qualities and which is anchored to prevent blow out and/or pinch off under opening and closing pressures.

It is still a further object to provide a resilient sealing member for a valve which will have small initial face contact and is easy to assemble.

It is another object to provide a seal member for a valve having a structural member to carry the thrust load and a resilient member to accomplish the sealing function.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description and are shown in the accompanying drawings, forming a part of the specification wherein:

Fig. 1 is a fragmentary vertical cross section of a gate valve incorporating a seal member of the present invention.

Fig. 2 is a perspective of the front face of a modified form of the sealing member.

Fig. 3 is a perspective of the rear face of a further modified form of seal member, part of the resilient material being broken away to show details of construction.

Fig. 4 is an enlarged cross section of a portion of the seal member.

Fig. 5 is a diagrammatic view of the gate and seal members, illustrating the condition when the upstream pressure is greater than the body pressure.

Fig. 6 is a view similar to Fig. 5 with the upstream and the body pressure equal.

Fig. 7 is a view similar to Fig. 5 with the body pressure greater than the upstream pressure.

Fig. 8 is a diagrammatic cross section showing the seal of the present invention incorporated in a rotary plug valve.

Referring now to the drawings, Fig. 1 shows improved resilient seal members 10—10 incorporated in a through-conduit gate valve 12. The gate valve 12 is comprised of a body 14 having aligned flow passages 16 and 18. The outer ends of the passages 16 and 18 are shown terminating in flanges 20—20 permitting the valve 12 to be connected to a flow system. Naturally, any other of the various well known means of finishing ends for connection to a flow system may be utilized.

The interior of the body 14 is provided with a valve chamber 22 to receive a movable valve member or gate 24. The valve member 24 consists of a substantially flat metal plate having a passage 26 adapted to register with the passages 16 and 18 in valve open position and a solid portion 28 to cover the passages 16 and 18 in valve closed position, the position shown in Fig. 1. The upper end of the gate 24 is attached to means, such as a stem 30, for raising and lowering the gate as is well known in the art.

The ends of the flow passages 16 and 18 adjacent the valve chamber 22 are machined to form seat pockets 32—32. The seat pockets are formed coaxially with the flow passages and are adapted to receive the seal members 10—10.

Each seal member 10 is comprised of a metal stamping or structural member 34 and a mass of resilient material 36. The stamping 34 is in the form of a generally rectangular flat plate, the rear surface of which is adapted to contact the wall of the valve chamber adjacent the pocket 32. Along the two longer sides of the plate there are upturned tab portions 38, which act as guides for the valve member 24. There is an opening 40 in the center of the stamping 34 which aligns with the flow passage of the valve. The metal adjacent the opening 40 slopes down rearwardly and then bends back up normal to the surface of the plate to form the wall of the opening 40. This portion 42 generally approaches the shape of an inclined J and will be referred to hereafter as such. The J shaped section 42 is adapted to fit into the pocket 32. The utilization of such a shape eliminates the necessity of a re-entry groove along the face of the body which is normally required to house resilient seals. The rearwardly sloping portion forms the leg 44 and the wall of the opening 40 forms the hook 46. Circumferentially spaced about the leg 44 there is a multiplicity of openings 48. The resilient material 36 is molded about the J shaped portion 42. A substantial mass 50 of the resilient material is located in the pocket between the leg and the hook of the J shaped portion 42. The mass 50 of material terminates in a raised portion 52 which is slightly higher than the surface of the stamping 34. Material adjacent the raised portion 52 is slightly relieved. There is a second mass 54 of resilient material on the rear face of the leg 44, and a third mass 56 surrounding the opening 40. The second mass 54 terminates in a knobular portion 58 adapted to contact the corner of the pocket 32, the knob 58 making an interference fit with the circumferential wall of the pocket 32. The two large masses 50 and 54, which are on opposite sides of the leg 44, act as presure sealing members as will be explained subsequently. If desired, the mass 50 of resilient material forming the face of the seal may be fairly hard and abrasive resistant to resist wear and the mass 54 of resilient material at the rear may be relatively soft, easily flowable material to act more truly as a hydraulic mass, see Fig. 4. The degree of softness of mass 54 will be governed by the pressure in the mass and the gap that it must bridge; that is, the mass may be of such softness that it can be confined by the walls of the pocket 32 and the hook of the J shaped section 42, thereby being forced to travel through the openings 48 to reinforce the face mass 50 and to actively move to replace the loss of face material due to wear. The resilient material is only bonded along the face of the leg 44 facing the hook 46 and about the hook 46, as indicated in Fig. 4, to give freedom of movement to the resilient material. The bonding together with the rear mass retains the resilient material from blowing out into the port upon opening the valve and subsequently pinching off when the valve closes. However, if desired, the resilient material 36 may be bonded to all surfaces of the structural members that it contacts.

While the sealing member 10 can be made without having any edges of the stamping 34 protruding past the wall of the pocket 32, the utilization of the stamping as a thrust receiving member 32 permits the use of lighter weight of metal as the stamping will then transmit the load directly to the body. Moreover, by the use of such construction, the stamping receives all wear and it is easier to replace a sealing member than to remachine the body.

Fig. 2 shows in addition to the upturned tabs 38 along the two longer edges of the stamping 34 an upturned tab 60 which acts as a stop for the gate 24 in a non-through conduit type gate. The tabs 38 may be of sufficient height so that opposing tabs will hold the seats apart in valve open position. To assemble a non-conduit type valve, one seat may be put in place and then roated slightly. The other seat is then rotated a similar amount in an opposite direction to allow the tabs to pass one another. The second seat is then dropped into place, positioned and both seats rotated back before installing the gate. In all other respects, the sealing member illustrated in Fig. 2 is identical to the one shown incorporated in Fig. 1. In Fig. 3 all of the guides have been eliminated from the edges of the sealing member. This particular form is adapted for utilization in a fabricated valve where it may be more feasible to use barstock along the sides for guides. In order to facilitate assembly of a through conduit type valve, it may be desirable to have tabs 38 on only one seat, since the gate 24 will keep the seats 10—10 apart and the tabs 38 are only utilized as guides.

The seal illustrated in Fig. 4 has a knob 58 at the rear corner. The knob 58 acts as a pilot seal and by putting this small area in compression—having an interference fit with the pocket 32—it is possible to effect a seal for the member 10 with a light installed pressure. However, if desired, the knob 58 can be eliminated and in place there can be sufficient interference between the circumference of the resilient material of the sealing element and the circumferential wall of the pocket to assure initial contact and seal.

The action of the pressure sealing element under various conditions is shown in Figs. 5, 6 and 7. In all figures the left hand side, conduit 16 is upstream. Fig. 5 illustrates the action when the usptream pressure is greater than the body pressure and the body pressure is greater than or equal to downstream pressure. As can be seen, the gate 24 has moved toward the downstream side and compressed the downstream seal into its pocket, thereby assuring a seal around the seat pocket 32. Also, since the face of the gate 24 is in intimate contact with the face of the sealing member 10, there will be no leakage about the port 40 and the face of the gate 32. Line pressure will have pushed the upstream seal 10 forward in its pocket so that it will contact the face of the gate 24 and prevent upstream leakage around the port 40 across the face of the gate 24. The knob 58 will be against the circumferential wall of the pocket 32 and prevent leakage of upstream fluid around the back of the seal 10.

Fig. 6 illustrates the condition when upstream and body pressure are equal but greater than downstream. As can be seen, the downstream seal 10 will again be compressed into its pocket 32 and the gate 24 will be in full contact with the face of the seal 10 preventing leakage between the resilient seal and its pocket 32 and through the opening 40 across the face of the gate 24. The upstream seal is in more or less a neutral condition; however, there is sufficient contact between the raised portion 52 of the face of the seal 10 and the face of the gate 24 to effect a seal around the port 40 across the face of the gate 24. Also, the knob 58 will contact the pocket sufficiently to effect a seal around the seal in the event of a pressure drop in the body.

Fig. 7 illustrates the condition when upstream pressure is less than body pressure but greater than downstream pressure. As in the two previous cases, the downstream seal is crammed into its pocket to prevent leakage either through the port 40 or around the back of the seal. The rear of the upstream seal is also crammed into its pocket to prevent any leakage around the sealing element. The raised portion 52 of the upstream seal makes a kiss contact with the face of the gate 24. If pressure in the body exceeds the upstream pressure by more than the design limit, the contact of the raised portion 52 with the face of the gate 24 will momentarily break, see dotted line in Fig. 7, and the pressure will tend to equalize, thus eliminating excessive body pressure. When pressures have equalized, contact between the seal and gate will be re-established. In valves made in accordance with this invention, it has been found that when the body pressure exceeds the upstream pressure by approximately 50 p.s.i., the body pressure relieves; however, this differential can be varied by adjusting the design criteria. By having such a feature, the danger of high trapped in body pressure, such as would result from solar or other heat radiation, is prevented.

In a through conduit type valve, as shown in Fig. 1, the sealing member 10 will also effect a seal about the port 40 in valve open position.

The foregoing discussion has been directed to the utilization of the improved resilient sealing member in a gate valve; however, the sealing member may be utilized in various other types of valves, as will be understood by those familiar with the art. For example, Fig. 8 shows a seal member 80 utilized in a rotary plug valve 82. The sealing member 80 is essentially the same as the sealing member 10 previously described—being comprised of a structural portion 84 and a resilient portion 86. The face of the structural portion 84 is shaped to conform to the configuration of the particular type plug 88 being used, such as cylindrical, conical or spherical. As in the case of sealing member 10, material of the structural portion adjacent the flow passage 90 is shaped to form a supporting means for the resilient portion 86. The formation can be similar to that of sealing member 10. The sealing member 80 will function similar to sealing member 10; however, instead of the sliding movement of the gate, there will be the rotary movement of the plug.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

We claim:
1. In a valve structure, a housing having a flow pas- sage therethrough, a chamber for a valve member intersecting said passage, a valve member in said chamber, an annular pocket in the wall of said housing concentric with said passage and a sealing member in said pocket, said sealing member comprising: a ring of plastic material positioned in the annular pocket and protruding slightly into the chamber, the ring being formed of two masses, the one in the pocket being soft and flowable and the one protruding into the chamber being relatively hard and abrasive resistant, a structural member generally separating said masses, said structural member being provided with a multiplicity of passages whereby material from the soft mass may flow through the member and rejuvenate the hard mass, means forming a seal between the ring and the outer wall of the pocket, a raised area on the face of the ring opposing the valve member establishing a seal between the valve member and ring, the diameter of such raised area being smaller than the diameter of the means sealing the ring to the pocket whereby when pressure in the flow passage is greater than pressure in the valve chamber the ring will act as a piston and move against the valve member inasmuch as the area presented to the pressure in the flow passage within the pocket is greater than the area presented to the pressure in the flow passage at the sealing member, means containing the soft mass preventing it from being blown into the flow passage and also containing the soft mass whereby when force is exerted on the ring, the soft mass will tend to flow through the passages in the structural member to rejuvenate the hard mass.

2. In a valve structure, a housing having a flow passage therethrough, a chamber for a valve member intersecting said passage, a valve member in said chamber, an annular pocket in the wall of said housing concentric with said passage and a sealing member in said pocket, said sealing member comprising: a ring of plastic material positioned in the annular pocket and protruding slightly into the chamber, annular means forming a seal between the ring and the outer wall of the pocket, a raised annular portion on the face of the ring opposing the valve member establishing a seal between the valve member and ring, the diameter of such raised annular portion being smaller than the diameter of the annular means sealing the ring to the pocket whereby when pressure in the upstream flow passage is greater than the pressure in the valve chamber and the pressure in the downstream flow passage, the ring acts as a free floating piston and moves against the valve member inasmuch as the area presented to the pressure in the flow passage within the pocket is greater than the area presented to the pressure in the flow passage at the sealing member, also whereby when pressure in the valve chamber equals the pressure in the upstream flow passage which is greater than the pressure in the downstream flow passage, the ring becomes a balanced free floating piston and as the pressure in the valve chamber becomes greater than the pressure in the upstream flow passage which is greater than the pressure in the downstream flow passage, the ring floats away from the valve member breaking the seal between the valve member and the ring allowing the pressure in the chamber to bleed off into the upstream flow passage.

3. In a valve structure, a housing having a flow passage therethrough, a chamber for a valve member intersecting said passage, a valve member in said chamber, annular pockets in the wall of said housing concentric with said passage and a sealing member in each of said pockets, each sealing member comprising: a ring of plastic material positioned in the annular pocket and protruding slightly into the chamber, annular means forming a seal between the ring and the outer wall of the pocket, a raised annular portion on the face of the ring opposing the valve member establishing a seal between the valve member and ring, the diameter of such raised annular portion being smaller than the diameter of the annular means sealing the ring to the pocket whereby when pressure in the upstream flow passage is greater than the pressure in the valve chamber and the pressure in the downstream flow passage, the upstream sealing member acts as a free floating piston and moves against the valve member inasmuch as the area presented to the pressure in the flow passage within the pocket is greater than the pressure in the upstream flow passage at the sealing member, also whereby when pressure in the valve chamber equals the pressure in the upstream flow passage which is greater than the pressure in the downstream flow passage, the upstream sealing member becomes a balanced free floating piston and as the pressure in the valve chamber becomes greater than the pressure in the upstream flow passage which is greater than the pressure in the downstream flow passage, the upstream sealing member floats away from the valve member breaking the seal between the valve member and the upstream sealing member allowing the pressure in the chamber to bleed off into the upstream flow passage.

4. In a valve structure, a housing having a flow passage therethrough and a chamber for a valve closure member intersecting said passage, a reciprocating valve closure member in said chamber, pockets in the wall of the housing concentric with said passage, said pockets having one side open to the passage and two sealing members, a sealing member positioned in each pocket, each sealing member comprising a structural member having a generally flat body portion, said body portion in contact with the wall of the housing adjacent the pocket, parallel edge portions on at least one of said sealing members folded inwardly toward the opposing sealing member to act as guides for the reciprocating valve member, each sealing member having a centrally located passage aligned with the flow passage, a portion of the structural member being bent away from the opposing seating member into the pocket, resilient material molded about said bent portion, one mass of said resilient material being located in said pocket sealing between the pocket and sealing member, a second mass of said resilient material in the front of said pocket terminating in a raised portion which normally extends above the face of the body portion of the sealing member and which is adapted to contact the face of the valve member to seal across the face of the valve member, means in the bent portion so that material from the rear can move to replace material in the face.

5. A sealing member for a valve, said sealing member comprising: a metal structural member having a central passage and a generally flat portion defining a plane normal to the axis of the passage surrounding the passage, a portion of the structural member adjacent said passage extending normal to the plane of the flat portion and an angularly extending portion connecting the normal extending portio to the flat portion, a plurality of spaced openings in the angularly extending portion and a quantity of resilient material molded to the structural member about the area adjacent to the central passage and angularly extending portion, one mass of the resilient material filling the space between the angularly extending portion and the normal extending portion, said mass forming the face of the sealing member, said mass having an annular ring extending beyond the plane formed by the flat portion, a second mass of the resilient material located on the other side of the angularly extending portion, said second mass having a generally cylindrical surface at right angles to the plane formed by the flat portion, the axial length of said second mass approximating the axial length of the angularly extending portion, said second mass at its radially outer edge having a portion extending beyond the cylindrical surface and outer face.

6. The structure specified in claim 5 characterized in that the material in the first mass is relatively hard and abrasive resistant and material in the second mass is soft and easily flowable whereby the material from the second mass can replace any worn material of the first mass.

7. The structure specified in claim 5 characterized in that the resilient material is bonded to the structural member at the normal extending portion and at the juncture of the flat portion and the angular extending portion.

8. The structure specified in claim 5 characterized in that there is a third mass of resilient material molded to the side of the normal extending portion adjacent to the passage, said portion being of substantially lesser area than the first and second masses.

9. The sealing member specified in claim 5 characterized in that the second mass of resilient material terminates in a knobular portion which extends past the cylindrical surface and outer face of the second mass.

10. The sealing member specified in claim 5 characterized in that there is a tab along one side of the structural member bent up normal to the face of the structural member.

11. The sealing member specified in claim 5 characterized in that there is a tab along the bottom edge of the structural member bent up normal to the face of the structural member.

12. A sealing member for a valve, said sealing member comprising: a metal structural member having a central passage and a generally flat portion defining a plane normal to the axis of the passage surrounding the passage, a portion of the structural member adjacent said passage extending normal to the plane of the flat portion and an angularly extending portion connecting the terminus of the normal extending portion to the flat portion, a plurality of spaced openings in the angularly extending portion and a quantity of resilient material molded to the structural member about the area adjacent to the central passage and angularly extending portion, one mass of the resilient material filling the space between the angularly extending portion and the normal extending portion, said mass forming the face of the sealing member and being relatively hard and abrasive resistant, said mass having an annular ring extending beyond the plane formed by the flat portion and an annular depression extending below said plane, a second mass of resilient material located on the other side of the angularly extending portion, said second mass being soft and easily flowable, said second mass having a generally cylindrical surface at right angles to the plane formed by the flat portion, the axial length of said second mass approximating the axial length of the angularly extending portion, said second mass at its radially outer edge having a knobular portion extending beyond the cylindrical surface and outer face.

13. In a valve structure, a housing having a flow passage therethrough and a chamber for a valve closure member intersecting said passage, a valve closure member in said chamber, pockets in the wall of the housing concentric with said passage, said pockets having one side open to the passage and two sealing members, a sealing member positioned in each pocket, each sealing member comprising a structural member having a body portion, said body portion in contact with the wall of the housing adjacent the pocket, the sealing member having a centrally located passage aligned with the flow passage, a portion of the structural member being bent away from the opposing sealing member into the pocket and resilient material molded about said bent portion, one mass of said resilient material being located in said pocket to effect a seal between the sealing member and the valve body, a second mass of said resilient material in the front of said pocket terminating in a raised portion which normally extends above the face of the body portion of the sealing member and which is adapted to contact the face of the valve member to effect a seal across the face of the valve member, the raised portion being so proportioned that upon an excessive increase in the body pressure the contact between the raised portion and the valve member will be interrupted permitting a relieving of body pressure.

References Cited in the file of this patent

UNITED STATES PATENTS

| | | |
|---|---|---|
| 1,157,956 | Osborne | Oct. 26, 1915 |
| 2,373,628 | Gleeson | Apr. 10, 1945 |
| 2,516,947 | Blevans | Aug. 1, 1950 |
| 2,606,740 | Allen | Aug. 12, 1952 |
| 2,732,170 | Shand | Jan. 24, 1956 |
| 2,810,543 | Bryant | Oct. 22, 1957 |
| 2,837,308 | Shand | June 3, 1958 |
| 2,864,580 | Lemoine | Dec. 16, 1958 |
| 2,908,293 | Johnson | Oct. 13, 1959 |

FOREIGN PATENTS

| | | |
|---|---|---|
| 749,932 | Great Britain | June 6, 1956 |